United States Patent [19]

Martin et al.

[11] 3,946,456
[45] Mar. 30, 1976

[54] BATTERY TERMINAL CLEANER

[75] Inventors: George G. Martin, Kent; Alvin J. Jones, Chesterland, both of Ohio

[73] Assignee: Milbar Corporation, Chagrin Falls, Ohio

[22] Filed: Mar. 13, 1974

[21] Appl. No.: 450,806

[52] U.S. Cl. ............... 15/105; 15/236 R; 15/184; 408/204
[51] Int. Cl.² ........................ B23D 79/08
[58] Field of Search 15/104.01 R, 104.02, 104.01 P, 15/236 R, 105; 145/3.31, 3.5, 3.6, 3.8; 408/204, 205

[56] References Cited
UNITED STATES PATENTS

| 1,389,152 | 8/1921 | Moore | 15/104.01 P X |
| 2,895,453 | 7/1959 | Jones | 145/3.31 X |
| 3,188,674 | 6/1965 | Hobbs | 15/179 |
| 3,763,510 | 10/1973 | Graham | 15/236 R X |
| 3,769,650 | 11/1973 | Newell | 15/105 |

FOREIGN PATENTS OR APPLICATIONS

| 636,489 | 5/1950 | United Kingdom | 15/236 R |
| 666,719 | 2/1952 | United Kingdom | 15/236 R |
| 12,793 | 7/1900 | United Kingdom | 145/3.8 |
| 510,700 | 1/1955 | Italy | 145/3.8 |

Primary Examiner—Daniel Blum
Attorney, Agent, or Firm—J. D. Douglass

[57] ABSTRACT

A battery post and terminal cleaner includes a hollow base with a hollow mandrel in the base with a space around the mandrel. A scraper element is disposed in the space between the mandrel and the outer surface of the base. The outer portion of the base houses the scraper blade. A reamer extends from and above the base and a cap is provided removably connected to the base and covers the reamer. The cap has a ribbed surface to provide a friction surface which is engaged by the hand for operating the scraper. The base is ribbed and provides a friction surface for the hand when the cap is removed, for performing a reaming operation.

10 Claims, 11 Drawing Figures

U.S. Patent  March 30, 1976  3,946,456
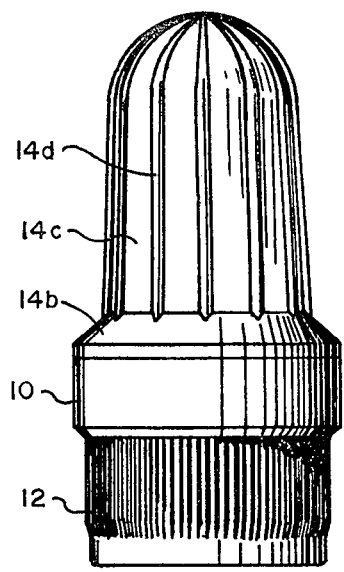
Fig. 1
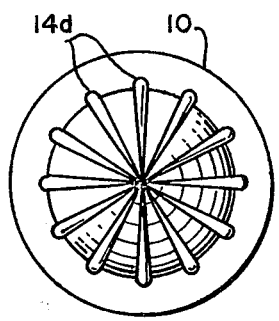
Fig. 2
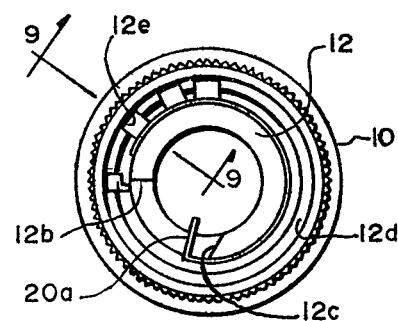
Fig. 3
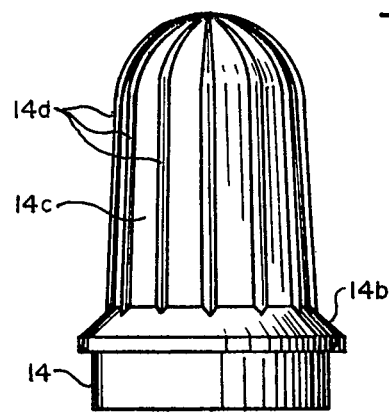
Fig. 4
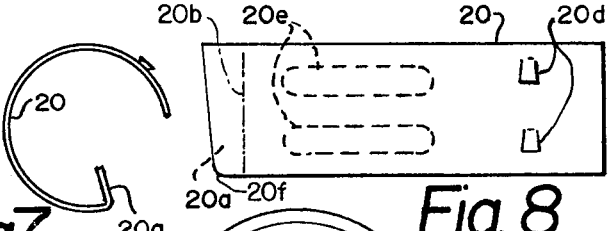
Fig. 7    Fig. 8
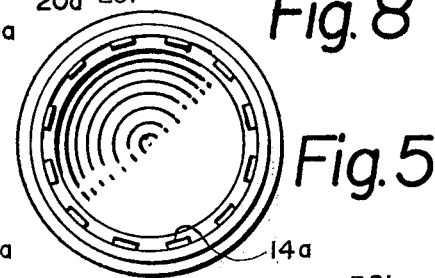
Fig. 5
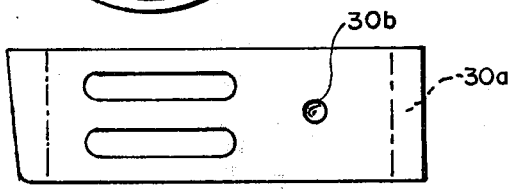
Fig. 10    Fig. 11
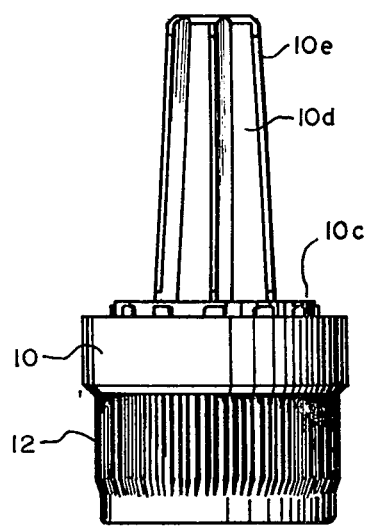
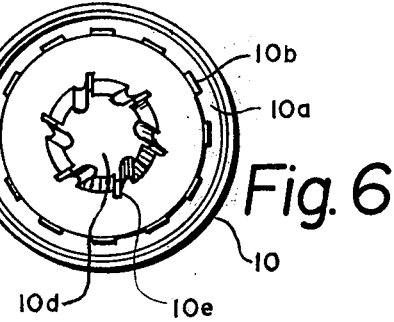
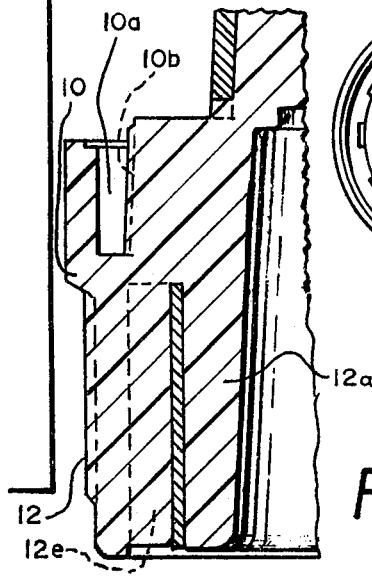
Fig. 9    Fig. 6

BATTERY TERMINAL CLEANER

BACKGROUND OF THE INVENTION

1. Field of the Invention

The invention relates to devices for the cleaning of the posts of electric storage batteries and terminals of battery cables.

2. Description Of The Prior Art

Various types of tools have been provided for the cleaning and/or shaping of the posts of electric storage batteries. Many of these, such as shown in U.S. Pat. Nos. 1,658,502; 1,692,911, and 1,741,531; have been combined with pliers or wrenches, which make them cumbersome to handle. They included scraper blades, secured to the handles or the jaws, to be pressed into engagement with the post being cleaned and then rotated to scrape the verdigris or other foreign matter from the posts. Plier-like devices, such as in Pat. No. 1,913,606, had the jaws made as scrapers or had scrapers attached to the jaws as in Pat. No. 2,405,680, or scraper blades attached to the handles as in Pat. No. 2,003,629.

Other types of tools such as shown in Pat. Nos. 1,710,127; 1,774,567; 2,204,516; 2,475,514; 2,562,136; 3,284,833 and 3,717,895, involved tools which could be placed over the posts and rotated, without the use of levers to exert pressure, to scrape the battery posts. Pat. 1,710,127 used brushes to do the cleaning. The others largely used a scraping action.

Pats. 2,562,136 and 3,717,895 in particular used a scraping action and these tools were used solely for cleaning the posts and therefore were not encumbered with parts which were used for other purposes.

Among the problems of the prior art was the fact that the tools had exposed scraping edges and required two different sized scrapers for the positive and negative posts. These devices were relatively large, taking up considerable space in a tool box and were so shaped that they did not fit in with the other tools and could not readily be placed in the pocket because of their shape and sharp exposed edges.

SUMMARY OF THE INVENTION

The present invention includes a generally cylindrical base housing of plastic material which houses a single scraper element or blade so mounted therein that it may scrape posts of different sizes and wherein the scrapings are largely retained until the device is cleaned. Extending upward from the base housing is a stem coaxial therewith in which blades are embedded for scraping or reaming the material from the inner surface of the battery cable terminals which are used to engage the battery posts.

The upper end of the base housing is provided with a groove adjacent the periphery in which the base of a cap may be inserted, the cap covering the reamer and provided with a ribbed outer surface which may be grasped by hand to rotate the base when placed over a post. The cap and the groove in the base are provided with inter-engaging splines which prevent the cap from rotating relative to the base.

Inasmuch as all the scraping or reaming parts are enclosed there is no danger of cutting or abrading the hand when the device is used. The device is much smaller than the prior art, thus eliminating storage problems when placed in the tool chest. Being smaller it may be carried in the users pocket, with no sharp edges to tear the pocket and the reaming and scraping parts are enclosed, thus there is less chance of the scrapings falling off in the pocket or the tool box and causing contamination of the other tools or enabling the acidic scrapings to attack the material of the clothing.

BRIEF DESCRIPTION OF THE DRAWINGS

FIG. 1 is a side elevational view of the device, assembled;

FIG. 2 is a top plan view thereof;

FIG. 3 is a bottom plan view thereof;

FIG. 4 is an exploded view showing the cap removed from the base;

FIG. 5 is a bottom plan view of the cap;

FIG. 6 is a top plan view of the base with the cap removed;

FIG. 7 is a top plan view of a scraper element removed from the housing;

FIG. 8 is a developed elevational view thereof;

FIG. 9 is an enlarged fragmentary section taken on the line 9—9 of FIG. 3;

FIG. 10 is a top plan view of a modified form of scraper element; and

FIG. 11 is a developed view of the element of FIG. 10.

DESCRIPTION OF THE PREFERRED EMBODIMENTS

The present invention contemplates the use of a two part housing which houses the working elements. FIG. 1 shows the housing parts assembled together and FIG. 4 with the top removed from the bottom to expose the terminal reamer. The bottom is open and houses the post scraper. The bottom includes a base 10 of cylindrical formation and a skirt 12 which has a ribbed exterior surface to provide a good surface for gripping by the hand when used as a reamer.

The base 10 has a groove 10a extending downward into the base, the inner of the groove walls being provided with splines 10b. The opposite wall also slants inward slightly in the downward direction to provide surfaces for wedging engagement with a skirt on the cap.

The center portion of the base at 10c projects slightly above the upper edge of the part 10, and, centrally thereof has an upwardly projecting tapered post 10d in which the reamer blades 10e are mounted. There is thus provided a tapered reamer which is used to clean the inside of the battery cable terminal and which is rotated by gripping the ribbed or knurled surface of the skirt 12.

The cap, FIGS. 2, 4 and 5, includes a cylindrical skirt 14, the outer surface of which is a sliding fit with the outer wall of the groove 10a in the base and the inner surface of which is provided with a plurality of splines 14a which are so spaced that when the cap is assembled with the base the splines on the cap extend between the splines on the base to prevent turning of the base relative to the cap. The skirt 14 is so tapered that when inserted in the groove 10a on the base a friction fit is realized, holding the cap to the base. A frusto-conical flange 14b is provided just above the skirt 14, the underside providing a shoulder that engages with the top of the base and limits the distance the skirt can be inserted into the groove 10a.

Extending upwardly from the flange 14b of the cap, is a bullet-shaped part 14c having ribs 14d extending longitudinally and vertically. The cap is hollow and when assembled with the base covers the reamer 10d. The ribs 14d provide a friction surface whereby turning movement by the hand to the cap is transmitted through the interengaging splines 14a and 10b.

The scraper element is housed in skirt 12 of the base. As best seen in FIGS. 9 and 3, a generally cylindrical-shaped hollow mandrel or projection 12a, coaxial with the skirt 12, extends downwardly toward the open end of the skirt. The mandrel is provided with a gap defined by the walls 12b and 12c, the wall 12b being aligned with a radius to the axis and the wall 12c being at an angle slanting from the outside to the right. The mandrel is spaced from the inner wall 12d of the skirt 12 to provide a generally ring-shaped recess between the mandrel and the wall. Near the wall 12b of the gap in the mandrel the skirt is provided with two or more inwardly extending spaced apart ribs or bosses 12e which extend toward the mandrel with a small gap between their inner edges and the mandrel.

The scraper element 20 is generally "C" shaped, FIG. 7, spring steel member formed to be smaller than the mandrel so that, when installed on the mandrel, it is held against the mandrel under spring tension. The one end is provided with a radially inwardly extending scraper blade portion 20a, best seen in the developed view of FIG. 8, which is bent from the element body on the dash-dot line 20b. The free edge of the blade is slanted at an angle corresponding to the taper of the battery post. The lower end is formed with a radius 20f, which enables the tool to be more easily placed over the battery posts and enables the cleaning of the base of the post leaving a cleaned fillet at the post base. The other end portion is forced into the gap between the ribs or bosses 12e and the outer surface of the mandrel which holds the blade in place and with the blade 20a spaced from the wall 12c in the gap in the mandrel. A pair of tongues 20d which may be of keystone shape are struck from the material of the element 20, both tongues extending in the same direction and with the wider parts being on the outer end and of such a width that they are slightly wider than the gaps between the ribs 12e so that when the element is inserted with the tongues between the ribs and the element 20 forced into position, the ends of the tongues displace some of the material on the opposing walls of the ribs to hold the element securely in place.

In this position the scraper is used when the cap 14c is in place to provide a good gripping surface, the hollow mandrel being placed over the battery post and pressed downward until the bottom edge of the mandrel engages with the post base. At this time the blade portion due to the spring action is forced outwardly, the element body moving away from the surface of the mandrel except where it is engaged between the ribs 12e and the mandrel.

It will be noted that the scraping part of the element 20 is spaced from the wall 12c to allow clearance space for chips or the material scraped from the post.

An alternative and preferred method of operation is to rotate the tool as it is being forced over and down on the post to gradually scrape the post as it is forced down until the desired part of the surface of the terminal post has been scraped clean.

It is pointed out that the ribs 12e could be one solid semi-ring shaped boss extending toward the mandrel and the end of the scraper blade, between the boss or ribs, held in place by a suitable cement. Since the scraper element extends from the ribs or boss, slightly more than 180° and the element is resilient, the blade 20a can move outward fairly freely but not free enough to interfere with its scraping action.

The blade may be made of heavier material and its resiliency in the portion thereof between the place where it is held and the scraper blade enhanced by providing one or more elongated slots 20e extending lengthwise of the element 20e shown in dotted lines in FIG. 8. Thus the end portion may have greater stiffness than the body part.

It is also contemplated that the scraper element may be formed as shown in FIGS. 10 and 11. In this instance, the one end of the blade 30 is formed with an inturned end 30a which extends radially inward for a distance slightly less than the wall thickness of the mandrel and hooks over the wall 12b to prevent the element from sliding around the mandrel during the scraping action. A detent 30b may be formed in the material to displace the material of the element which will in turn displace the material of the boss or ribs when it is pressed into the body of the housing to prevent it from falling out, although under ordinary circumstances the friction of the ribs 12e or the boss will prevent such from occurring.

It will be apparent that because of the resiliency of the scraper element a single element will suffice for scraping either the positive or negative terminal post. Inasmuch as the greater corrosion occurs on the positive post and is harder to remove, the device because of its design and construction automatically exerts greater pressure thereon although there is still sufficient pressure to scrape the negative post.

It will also be appaprent that the ribbed cap provides a good gripping surface for the hand when being used as a scraper, preventing injury from the reamer portion, and that the base 12 provides a good gripping surface when the cap is removed and the device being used as a reamer to clean the terminals. The length of the reamer and the taper is such that only one reamer is needed to clean both sizes of terminals since the negative terminal engages with the outermost portion of the reamer and the positive terminal is engaged by that portion closer to the base.

The hollow mandrel is easily kept clean from the scrapings, as also is the reamer. When the cap is in place it may be placed in the pocket without tearing the same or easily stored in a tool box where it utilizes a minimum of space.

I am aware of post cleaners made with mandrel only and a scraper blade held onto the mandrel with one or more screws which extend through the mandrel wall. Such cleaners were generally X-shaped requiring two scraper blades and one or more reamers. Due to the X-shape, injury to the hands could occur and they could not be carried in a pocket and took up much more room in the tool chest.

We claim:

1. A tool of the class described comprising a housing, a scraper element disposed in the housing, said housing being formed with a mandrel and a scraper element being disposed partially around the mandrel, the wall of the housing being spaced from the mandrel and at least one projection extending from the wall into close proximity to the mandrel and one end of said scraper element being held by being disposed around the projection and the mandrel, said scraper element being of C shape and made of resilient metal, the mandrel having an axial opening defining a wall for disposal around a post, and being formed with a gap and said scraper element having a blade portion extending through said gap into said opening.

2. A tool as described in claim 1 wherein said blade portion has a scraping edge slanting inward toward the axis of the tool to conform to a battery post taper.

3. A tool as described in claim 2 wherein one corner of said blade is rounded for engagement with the battery post near the bottom thereof.

4. A tool as described in claim 1 wherein there are at least two spaced projections extending toward said mandrel and said scraper element is formed with at least one tongue engaged between a pair of said projections.

5. A tool as described in claim 2 wherein said scraper element is formed with at least one slot in the body to increase the resiliency thereof.

6. A tool as described in claim 5 wherein said housing includes a base with said scraper element disposed therein and a reamer is secured to and extends above the base, a removable cap disposed in interlocking engagement with the base and enclosing said reamer.

7. A tool as described in claim 6 wherein the housing has a skirt which is formed with a friction surface whereby it may be turned by hand.

8. A tool as described in claim 7 wherein said cap is provided with a friction surface whereby it may be turned by hand to rotate the base.

9. A tool as described in claim 8 wherein said interlocking engagement is provided by splines on the inside of said cap and said base is provided with a groove to receive said cap and the inner wall of said groove is provided with splines engaging with the splines of said cap.

10. A tool as described in claim 9 wherein the outer wall of said cap which goes into the groove in the base is tapered to provide wedging engagement therewith, when assembled.

* * * * *